United States Patent

Miyazawa

(10) Patent No.: US 10,124,763 B2
(45) Date of Patent: Nov. 13, 2018

(54) KEYLESS ENTRY APPARATUS

(71) Applicant: Alps Electric Co., Ltd., Tokyo (JP)

(72) Inventor: Akira Miyazawa, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 151 days.

(21) Appl. No.: 15/260,796

(22) Filed: Sep. 9, 2016

(65) Prior Publication Data

US 2016/0375861 A1 Dec. 29, 2016

Related U.S. Application Data

(63) Continuation of application No. PCT/JP2015/062404, filed on Apr. 23, 2015.

(30) Foreign Application Priority Data

May 13, 2014 (JP) .................................. 2014-099746

(51) Int. Cl.
*B60R 25/04* (2013.01)
*B60R 25/24* (2013.01)
(Continued)

(52) U.S. Cl.
CPC .............. *B60R 25/04* (2013.01); *B60R 25/24* (2013.01); *B60R 25/245* (2013.01); *E05B 81/54* (2013.01);
(Continued)

(58) Field of Classification Search
CPC ....... B60R 25/24; B60R 25/04; B60R 25/245; E05B 81/54; E05B 81/70; G07C 9/00309; G07C 2209/63; G07C 2009/00769
(Continued)

(56) References Cited

U.S. PATENT DOCUMENTS 7,336,151 B2    2/2008  Ueda et al.
8,044,771 B2   10/2011  Nakajima et al.
(Continued)

FOREIGN PATENT DOCUMENTS

CN    101290688    4/2012
CN    102673522    2/2015
(Continued)

OTHER PUBLICATIONS

International Search Report dated Jul. 7, 2015 from International Application No. PCT/JP2015/062404.

*Primary Examiner* — Nga X Nguyen
(74) *Attorney, Agent, or Firm* — Beyer Law Group LLP

(57) ABSTRACT

A vehicle-side device that is provided on the vehicle side and transmits a signal at a first frequency, and a portable device that is able to be carried by a user and transmits a signal at a second frequency are included. The portable device transmits a signal of data based on a reception intensity of a measurement signal transmitted from the vehicle-side device, and the vehicle-side device performs predetermined control on the basis of the data based on the reception intensity of the measurement signal transmitted from the portable device. The vehicle-side device transmits a start-up signal to the portable device, the portable device transmits a request signal or a signaling signal to the vehicle-side device at predetermined time intervals when receiving the start-up signal, and the vehicle-side device transmits the measurement signal to the portable device each time the vehicle-side device receives the request signal or the signaling signal.

5 Claims, 5 Drawing Sheets

(51) Int. Cl.
  *E05B 81/54* (2014.01)
  *E05B 81/70* (2014.01)
  *G07C 9/00* (2006.01)
(52) U.S. Cl.
  CPC .......... *E05B 81/70* (2013.01); *G07C 9/00309* (2013.01); *G07C 2009/00769* (2013.01); *G07C 2209/63* (2013.01)
(58) Field of Classification Search
  USPC .................... 701/2, 36–37, 51–52, 451, 571; 340/4.34, 10.1, 2, 36–37, 51–52, 451, 571
  See application file for complete search history.

(56) References Cited

U.S. PATENT DOCUMENTS

| | | | |
|---|---|---|---|
| 8,232,863 | B2 | 7/2012 | Nakajima et al. |
| 8,310,338 | B2 * | 11/2012 | Hamada ................ B60R 25/245 340/5.6 |
| 2004/0142732 | A1 | 7/2004 | Ueda et al. |
| 2010/0201483 | A1 * | 8/2010 | Nakajima ............. B60R 25/245 340/5.61 |
| 2011/0309922 | A1 * | 12/2011 | Ghabra ................... B60R 25/24 340/426.36 |
| 2013/0293348 | A1 * | 11/2013 | Obergfell ............... B60R 25/24 340/5.61 |

FOREIGN PATENT DOCUMENTS

| | | |
|---|---|---|
| JP | 2003-201784 | 7/2003 |
| JP | 2006-169753 | 6/2006 |
| JP | 2010-031589 | 2/2010 |
| JP | 2010-181295 | 8/2010 |
| JP | 2012-184604 | 9/2012 |
| JP | 2013-088286 | 5/2013 |
| JP | 2014-25206 | 2/2014 |

* cited by examiner

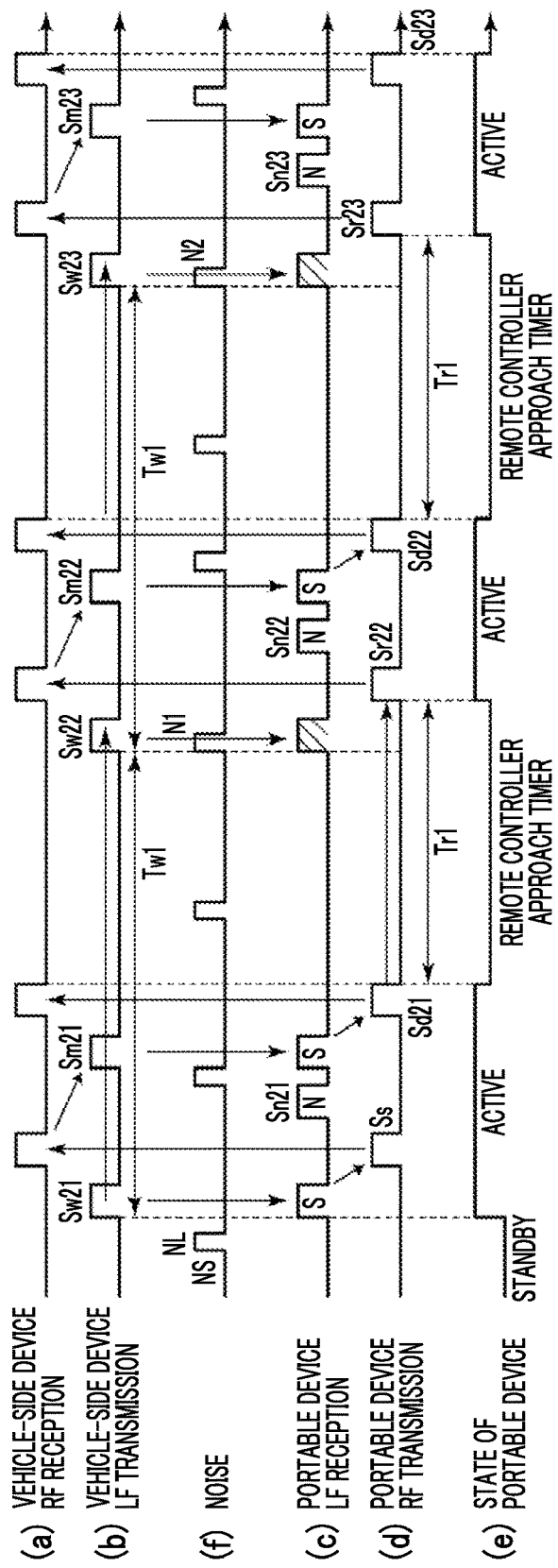

KEYLESS ENTRY APPARATUS

CLAIM OF PRIORITY

This application claims benefit of Japanese Patent Application No. 2014-099746 filed on May 13, 2014 and International Application No. PCT/JP2015/062404 filed on Apr. 23, 2015, which are hereby incorporated by references.

BACKGROUND OF THE INVENTION

1. Field of the Invention

The present invention relates to a keyless entry apparatus that performs predetermined control such as locking and unlocking of doors of a vehicle by performing communication between a vehicle-side device and a portable device.

2. Description of the Related Art

A smart keyless entry apparatus in which wireless communication is performed between a vehicle-side device provided in a vehicle and a portable device carried by a user, and a door of the vehicle is locked or unlocked on the basis of this communication has been proposed (for example, Japanese Unexamined Patent Application Publication No. 2010-181295). In this smart keyless entry apparatus, the vehicle-side device includes a plurality of transmission antennas provided in respective places on the vehicle, and periodically transmits a start-up signal to the portable device to start up the portable device from a sleep state. The vehicle-side device transmits a measurement signal from each transmission antenna after a predetermined time elapses from the transmission of the start-up signal. The portable device that has started up then calculates a distance between the portable device and the vehicle-side device on the basis of a reception intensity of the measurement signal transmitted from the vehicle-side device, transmits distance data to the vehicle-side device, and enters a sleep mode until the portable device receives a next start-up signal. Accordingly, a distance between the vehicle and the portable device is calculated in a predetermined time period, and control of locking and unlocking of a door of the vehicle is performed according to a result of the calculation.

However, in a smart keyless entry apparatus of the related art, in a case in which a user carries a smartphone or another information device, a portable device receives radio waves generated by the information device, in addition to a start-up signal or a measurement signal transmitted from a vehicle-side device. Therefore, the start-up signal transmitted from the vehicle-side device may be buried in noise signals other than such a signal and may not be able to be discriminated from these. Accordingly, the portable device cannot be started up. Here, since the start-up signal has a complex signal waveform including information unlike a measurement signal having a simple waveform, the start-up signal is easily influenced by a noise signal. In a case in which the start-up signal is buried in noise signals, a signal is not returned from the portable device to the vehicle-side device. Accordingly, there is a problem in that the vehicle-side device erroneously determines that the portable device is at a position away from the vehicle regardless of an actual position of the portable device, a door is locked though a user is near the vehicle, and the door cannot be unlocked though the user is approaching.

SUMMARY OF THE INVENTION

The present invention provides a keyless entry apparatus capable of reliably measuring a distance between a vehicle and a portable device at predetermined time intervals even when a user carries an information device, and reducing erroneous control due to start-up failure of the portable device.

In order to solve the above problems, the keyless entry apparatus of the present invention is a keyless entry apparatus including a vehicle-side device that is provided on the vehicle side and transmits a signal at a first frequency, and a portable device that is able to be carried by a user and transmits a signal at a second frequency, the portable device transmitting a signal of data based on a reception intensity of a measurement signal transmitted from the vehicle-side device, and the vehicle-side device performing predetermined control of the vehicle on the basis of the data based on the reception intensity of the measurement signal transmitted from the portable device, in which the vehicle-side device transmits a start-up signal to the portable device, the portable device transmits a request signal to the vehicle-side device at predetermined time intervals when receiving the start-up signal, and the vehicle-side device transmits the measurement signal to the portable device each time the vehicle-side device receives the request signal.

Thus, once the portable device is started up, the request signal for requesting the transmission of the measurement signal is then transmitted at predetermined time intervals from the portable device and the measurement signal is waited for at a predetermined timing. Therefore, it is not necessary to start up the portable device for each measurement of the intensity using the start-up signal from the vehicle-side device, unlike in the related art, and it is possible to suppress erroneous recognition caused by start-up failure of the portable device due to noise or the like from another information device.

In the keyless entry apparatus of the present invention, it is preferable that the vehicle-side device transmits a first start-up signal as the start-up signal to the portable device immediately after a user closes a door, and the portable device transmits the request signal to the vehicle-side device in the predetermined time period when the portable device receives the first start-up signal.

Thus, since the first start-up signal is transmitted immediately after the user closes the door, and the request signal for requesting transmission of the measurement signal is requested from the portable device to the vehicle-side device in a predetermined time period after the start-up signal is received, the start-up signal reaches the portable device while the portable device is near the vehicle. Here, "immediately after the user closes the door" means a period of time in which the portable device is near the vehicle and a signal from the vehicle-side device reliably reaches the portable device, such as a time after 100 ms from detection of closing of the door. Accordingly, an SN ratio increases since the portable device can receive a strong signal near the vehicle. Therefore, it is possible to reliably start up the portable device while suppressing the influence of a noise signal from an information device carried by the user. Further, if the start-up signal is received immediately after the door closes, the request signal for the measurement signal is then output at predetermined time intervals from the portable device and the measurement signal is waited for at a predetermined timing. Therefore, it is not necessary to start up the portable device using the start-up signal each time, unlike in the related art, and even in an environment in which there is a noise signal, it is possible to reliably perform periodic distance measurement and control.

In the keyless entry apparatus of the present invention, it is preferable that the vehicle-side device transmits a second start-up signal as the start-up signal to the portable device in a predetermined time period, the portable device acquires noise component data based on the signal intensity of the signal received in an OFF time in which the portable device does not communicate with the vehicle-side device when the portable device is started up by the second start-up signal, and the keyless entry apparatus determines whether a signal intensity of the noise component data is equal to or greater than a predetermined threshold value, and transmits the request signal at predetermined time intervals when the signal intensity of the noise component data is equal to or greater than the predetermined threshold value.

Accordingly, it is possible to accurately perform control of the vehicle even when there is background noise such as noise generated by an information device that a user has. Further, since the request signal is transmitted from the portable device at predetermined time intervals only when the background noise is equal to or greater than the predetermined threshold value, it is possible to suppress wasteful power consumption in the portable device.

In the keyless entry apparatus of the present invention, it is preferable that the portable device acquires the noise component data in an OFF time in which the portable device does not communicate with the vehicle-side device after the transmission of the request signal, and the keyless entry apparatus continues to transmit the request signal at predetermined time intervals when a signal intensity of the noise component data is equal to or greater than a predetermined threshold value, and stops the transmission of the request signal at predetermined time intervals when the signal intensity of the noise component data is smaller than the predetermined threshold value.

In the keyless entry apparatus of the present invention, it is preferable that, when the portable device receives the start-up signal, the portable device transmits a signaling signal indicating that the portable device has received the start-up signal from a second transmission antenna to the vehicle-side device, and the portable device transmits the request signal from the second transmission antenna to the vehicle-side device after a predetermined time has elapsed from the transmission of the signaling signal.

By transmitting the signaling signal, it can be confirmed that the portable device is within a coverage area and has started up.

In the keyless entry apparatus of the present invention, it is preferable that the first frequency is in a long wave region, and the second frequency is in a high frequency region higher than the first frequency.

It is possible to suppress the influence of noise in a long wave region output from an information device by transmitting a signal at the first frequency from the vehicle-side device and transmitting a signal at the second frequency higher than the first frequency from the portable device.

According to the present invention, by transmitting the request signal at predetermined time intervals from the portable device once the portable device starts up even when a user carries an information device, start-up failure is eliminated and it is possible to reliably perform measurement of the reception intensity of the measurement signal. Thus, even when the user has an information device, it is possible to accurately perform predetermined control of the vehicle.

BRIEF DESCRIPTION OF THE DRAWINGS

FIG. 5 is a timing chart illustrating timing of transmission and reception of signals in the vehicle-side device and the portable device, noise generated by the portable device, and a state of the portable device when a signal intensity of noise component data is equal to or greater than a threshold value in the second embodiment.

DESCRIPTION OF THE PREFERRED EMBODIMENTS

Hereinafter, keyless entry apparatus according to an embodiment of the present invention will be described in detail with reference to the drawings.

First Embodiment

Figure 1:
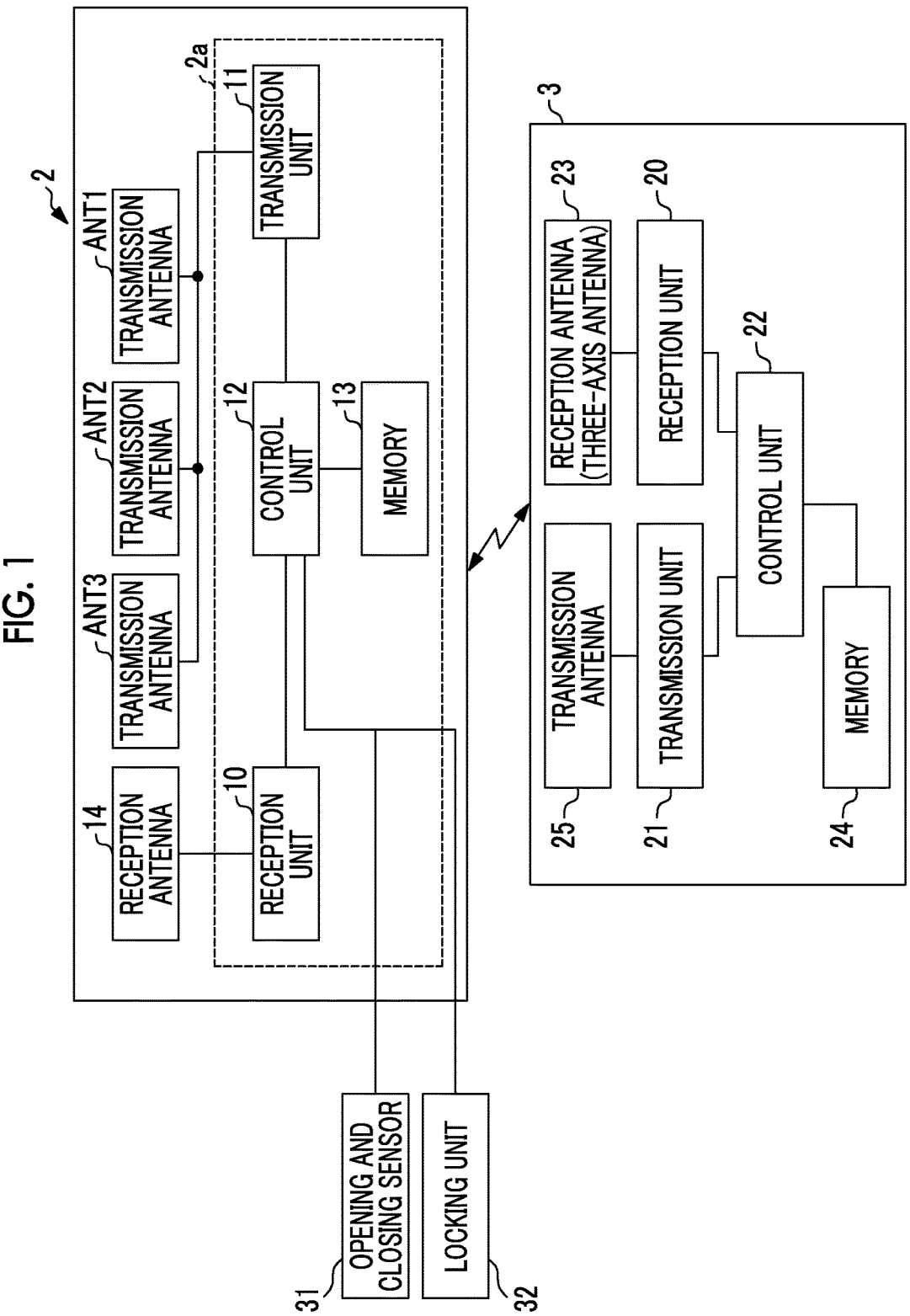
FIG. 1 is a block diagram illustrating a configuration of a keyless entry apparatus according to a first embodiment.
Figure 2:
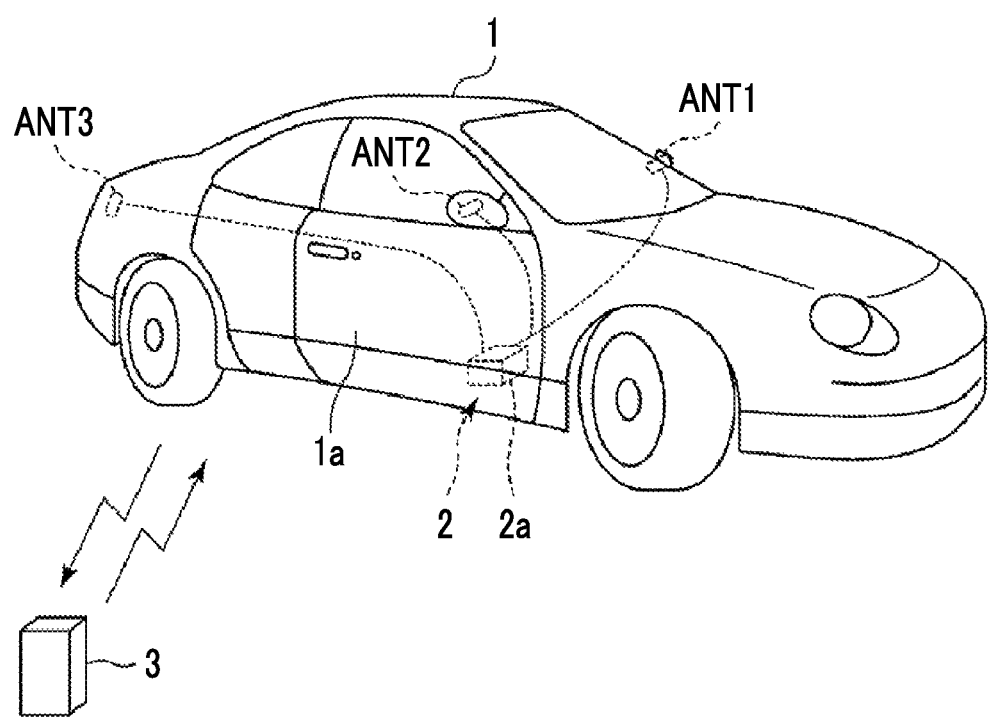
FIG. 2 is a perspective view illustrating a configuration of a vehicle-side device according to the first embodiment.

FIG. 1 is a block diagram illustrating a configuration of a keyless entry apparatus according to a first embodiment, and FIG. 2 is a perspective view illustrating a configuration of a vehicle-side device according to the first embodiment. In the keyless entry apparatus according to the first embodiment, a vehicle-side device 2 is provided on a vehicle 1 side, performs wireless communication with a portable device 3 that can be carried by a user, and performs locking and unlocking of the door 1a and predetermined other control of the vehicle 1.

The vehicle-side device 2 includes an electronic control unit 2a disposed in the vehicle 1, a plurality of transmission antennas ANT1 to ANT3 as a first transmission antenna, and a reception antenna 14. The electronic control unit 2a includes a vehicle-side reception unit 10 (reception unit), a vehicle-side transmission unit 11 (transmission unit), a vehicle-side control unit 12 (control unit), and a memory 13.

The vehicle-side reception unit 10 receives distance data on the basis of a reception intensity of a signal transmitted from the portable device 3 such as a request signal, or a measurement signal transmitted from the vehicle-side device 2. The vehicle-side transmission unit 11 transmits a signal (for example, a start-up signal or a measurement signal) to the portable device 3. The vehicle-side control unit 12 performs locking and unlocking of the door 1a and another predetermined control of the vehicle 1 on the basis of the distance data based on the reception intensity of the measurement signal, which is transmitted from the portable device 3, in addition to controlling operations of the vehicle-side reception unit 10 and the vehicle-side transmission unit 11.

Further, an opening and closing sensor 31 that detects opening and closing of the door 1a is connected to the vehicle-side control unit 12, and a detection signal from the opening and closing sensor 31 is input. Further, a locking unit 32 that controls locking and unlocking of the door 1a is connected to the vehicle-side control unit 12, and the door 1a is controlled to be locked or unlocked using information of the vehicle-side control unit 12.

The memory 13 stores a unique ID of the vehicle, IDs of a plurality of portable devices that can operate one vehicle, information necessary for performing predetermined control of the vehicle 1 on the basis of the data based on the reception intensity of the measurement signal, information on an interval of signals that are transmitted from the vehicle-side device 2, and the like.

The plurality of transmission antennas ANT1 to ANT3 for transmitting a signal at a first frequency are connected to the vehicle-side transmission unit 11. The plurality of transmission antennas ANT1 to ANT3 are provided at respective places of the vehicle 1, such as a plurality of doors or near the doors. Here, as the first frequency, it is preferable for a low frequency (LF) in a long wave region such as 30 to 300 kHz to be used. A very low frequency region (VLF) may also be used. Further, a reception antenna 14 for receiving a signal transmitted from the portable device 3 is connected to the vehicle-side reception unit 10.

As illustrated in FIG. 1, the portable device 3 includes a portable device reception unit 20 (reception unit), a portable device transmission unit 21 (transmission unit), a portable device control unit 22 (control unit), a portable device reception antenna (three-axis antenna or a reception antenna) 23, a memory 24, a portable device transmission antenna (transmission antenna) 25.

The portable device reception unit 20 receives a signal transmitted from the vehicle-side device 2, such as a start-up signal or a measurement signal. The portable device transmission unit 21 transmits a signal (for example, a request signal, and distance data based on the reception intensity of the measurement signal transmitted from the vehicle-side device 2) to the vehicle-side device 2. The portable device control unit 22 calculates the distance data on the basis of the reception intensity of the measurement signal transmitted from the vehicle-side device 2, in addition to controlling operations of the portable device transmission unit 21 and the portable device reception unit 20. The memory 24 stores an ID set in the portable device 3, an vehicle-side ID, information necessary for calculation of the distance data on the basis of the reception intensity of the measurement signal, information on an interval of a signal to be transmitted from the portable device 3, and the like.

Further, a reception antenna 23 is connected to the portable device reception unit 20. The reception antenna 23 is a three-axis antenna having a directivity characteristic of three directions that are orthogonal to one another, and receives a signal at a first frequency transmitted from the vehicle-side transmission unit 11. A transmission antenna 25 is connected to the portable device transmission unit 21. The transmission antenna 25 is a second transmission antenna, and transmits a signal at a second frequency to the vehicle-side device 2. Here, the second frequency is a frequency (RF) higher than the first frequency.

In the keyless entry apparatus according to the first embodiment, communication is performed between the vehicle-side device 2 and the portable device 3 and predetermined control of the vehicle 1 is performed in the following procedures (1) to (5).

(1) The vehicle-side device 2 transmits a start-up signal (first start-up signal) sequentially from the plurality of transmission antennas ANT1 to ANT3 to the portable device 3 immediately after a user closes the door 1a. The first start-up signal may be transmitted from any of the transmission antennas ANT1 to ANT3. For example, the first start-up signal may be transmitted from the antenna close to the closed door 1a.

(2) If the portable device 3 receives the start-up signal using the reception antenna 23, the portable device 3 transmits a signaling signal indicating that the portable device 3 has received the start-up signal, from the transmission antenna 25 to the vehicle-side device 2. Further, after a predetermined time elapses from signaling signal transmission, the portable device 3 transmits a request signal from the transmission antenna 25 to the vehicle-side device 2 to request the vehicle-side device 2 to transmit the measurement signal. This request signal is transmitted in a predetermined time period such as 300 to 500 ms.

Here, it is preferable for the request signal to continue to be transmitted a predetermined number of times. Further, the request signal may be combined with the signaling signal.

(3) The vehicle-side device 2 transmits the measurement signal sequentially from the plurality of transmission antennas ANT1 to ANT3 to the portable device 3 each time the vehicle-side device 2 receives the request signal using the reception antenna 14.

(4) If the portable device 3 receives the measurement signal using the reception antenna 23, the portable device control unit 22 calculates a distance between the vehicle-side device 2 and the portable device 3 on the basis of a reception intensity of the measurement signal. Calculated distance data is transmitted from the transmission antenna 25 to the vehicle-side device 2.

(5) In the vehicle-side device 2, the vehicle-side control unit 12 performs a determination as to whether locking of the door 1a is to be performed on the basis of the distance data received by the reception antenna 14, and the locking unit 32 performs the locking of the door 1a according to a result of the determination.

Figure 3:
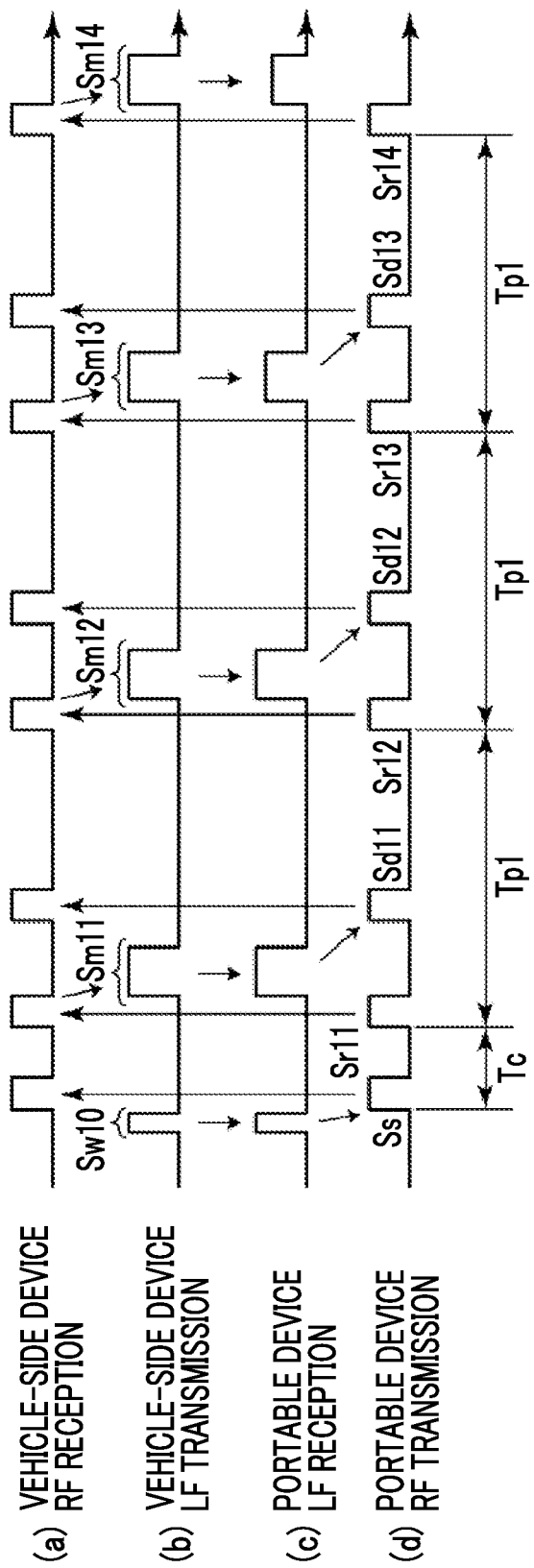
FIG. 3 is a timing chart illustrating timing of transmission and reception of signals in the vehicle-side device and a portable device according to the first embodiment.

Next, a flow of communication between the vehicle-side device 2 and the portable device 3 will be described in greater detail with reference to FIG. 3. FIG. 3 is a timing chart illustrating a timing of transmission and reception of a signal in the vehicle-side device 2 and the portable device 3. (a) a signal at a second frequency (RF) received by the vehicle-side device 2, (b) a signal at a first frequency (LF) transmitted by the vehicle-side device 2, (c) a signal at the first frequency (LF) received by the portable device 3, and (d) a signal at the second frequency (RF) transmitted by the portable device 3 are shown in order from the top.

If the user closes the door 1a, the vehicle-side device 2 transmits a start-up signal Sw10 sequentially from the plurality of transmission antennas ANT1 to ANT3 to the portable device 3 immediately after the user closes the door 1a (for example, after 100 ms).

The portable device 3 that has received the start-up signal Sw10 starts up from a standby state in which power consumption is suppressed, starts time measurement using a timer unit included in the portable device control unit 22, and transmits a signaling signal Ss indicating that the portable device 3 has received the start-up signal Sw10 from the transmission antenna 25 to the vehicle-side device 2. After a predetermined time Tc has elapsed from the transmission of the signaling signal Ss, the portable device 3 transmits a request signal Sr11 for requesting transmission of a measurement signal from the transmission antenna 25 to the vehicle-side device 2. Here, a function of the request signal may be combined with the signaling signal Ss.

The vehicle-side device 2 that has received the signaling signal Ss and the request signal Sr11 transmits a measurement signal Sm11 sequentially from the plurality of transmission antennas ANT1 to ANT3 to the portable device 3. Here, in a case in which the vehicle-side device 2 does not receive the signaling signal Ss within a predetermined time after transmitting the start-up signal SW10, the vehicle-side device 2 repeatedly transmits the start-up signal SW10 to the portable device 3 until the vehicle-side device 2 receives the signaling signal Ss. Here, measurement of a time to wait for reception of the signaling signal Ss and other time is performed by a timer unit included in the vehicle-side control unit 12.

Then, in the portable device 3 that has received the measurement signal Sm11, the portable device control unit 22 calculates a distance between the vehicle-side device 2 and the portable device 3 on the basis of the reception intensity of the measurement signal Sm11 received from the portable device reception unit 20. Calculated distance data Sd11 is transmitted from the transmission antenna 25 to the vehicle-side device 2.

In the vehicle-side device 2 that has received the distance data Sd11, the vehicle-side control unit 12 performs a determination as to whether locking of the door 1a is to be performed on the basis of distance data, and outputs a signal corresponding to a result of the determination to the locking unit 32.

The portable device 3 sequentially transmits request signals Sr12, Sr13, Sr14, ... to the vehicle-side device 2 in a predetermined time period from the transmission of the request signal Sr11, that is, in every time Tp1. The vehicle-side device 2 transmits measurement signals Sm12, Sm13, Sm14, ... in response to the request signals Sr12, Sr13, Sr14, .... Further, the portable device 3 calculates the distance between the vehicle-side device 2 and the portable device 3 in response to the measurement signals Sm12, Sm13, ..., and transmits calculated distance data Sd12, Sd13, ... to the vehicle-side device 2. In this operation, in a case in which the distance between the vehicle-side device 2 and the portable device 3 is equal to or greater than a threshold value or in a case in which the vehicle-side device 2 does not receive the request signal, the vehicle-side control unit 12 outputs a signal for instructing locking of the door 1a to the locking unit 32, and the locking unit 32 locks the door 1a. Here, measurement of the time Tc and Tp1 and other time is performed by a timer unit included in the portable device control unit 22.

From the configuration as described above, the following effects are achieved according to the keyless entry apparatus of the first embodiment.

(1) Since the start-up signal (first start-up signal) is transmitted immediately after the user closes the door 1a, and the request signal is transmitted from the portable device 3 to the vehicle-side device 2 in a predetermined time period after reception of the start-up signal, the portable device 3 can reliably start up by suppressing influence of a noise signal by an information device carried by the user since the start-up signal reaches the portable device 3 while the portable device 3 is being near the vehicle 1. Further, when the start-up signal is received immediately after the door 1a is closed, the timer unit included in the portable device control unit 22 then manages the time, and periodically requests the measurement signal at a second frequency (RF). The portable device 3 can also manages waiting timing of the measurement signal that is transmitted from the vehicle-side device 2 in response to the request. Since there is no need to receive the start-up signal, it is possible to reliably perform periodic distance measurement and control even in an environment in which there is a noise signal. On the other hand, in a scheme of the related art, since a portable device is started up using a start-up signal and a measurement signal is waited for in each measurement, a malfunction occurs unless the start-up signal is reliably received.

(2) It is possible to suppress influence of noise in a long wave region output from an information device by transmitting a signal at the first frequency from the vehicle-side device 2 and transmitting a signal at the second frequency higher than the first frequency from the portable device 3.

Second Embodiment

Figure 4:
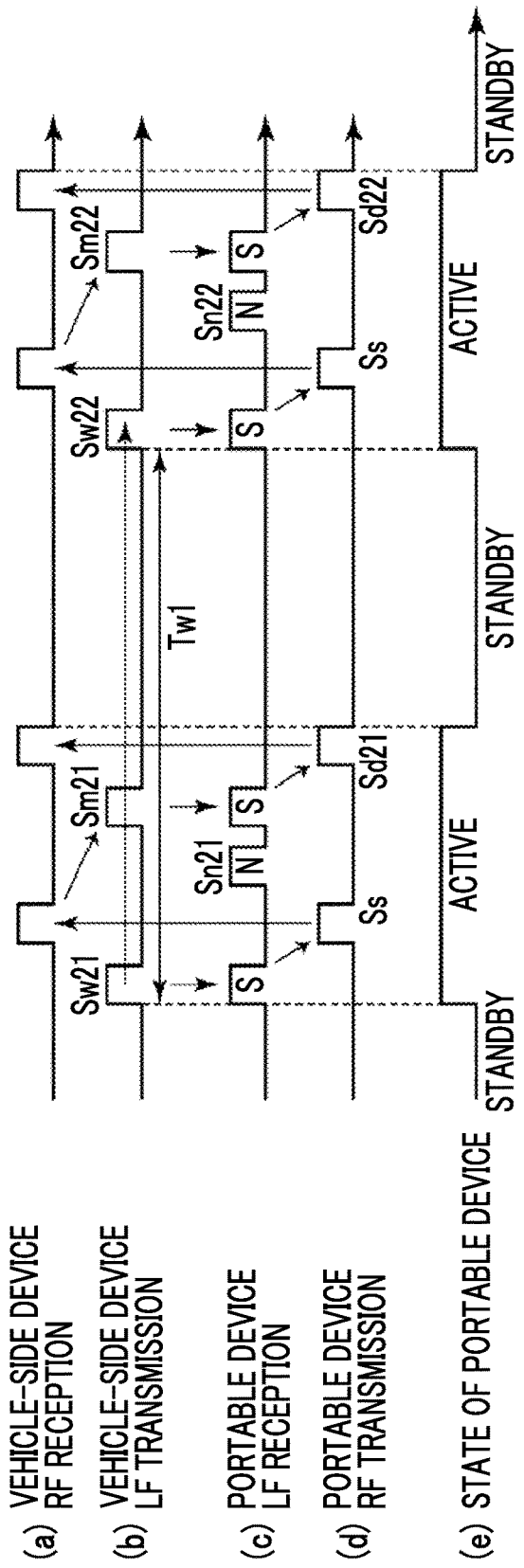
FIG. 4 is a timing chart illustrating timing of transmission and reception of signals in a vehicle-side device and a portable device, and a state of the portable device when a signal intensity of noise component data is smaller than a threshold value in a second embodiment.

A keyless entry apparatus according to a second embodiment of the present invention will be described with reference to FIGS. 4 and 5. In the second embodiment, the same configuration as that in the first embodiment illustrated in FIGS. 1 and 2 is included. In the following description, detailed description of the same configuration, operation, and effects as in the first embodiment will be omitted. FIG. 4 is a timing chart illustrating a timing of transmission and reception of signals in the vehicle-side device and the portable device and a state of the portable device when a signal intensity of noise component data is smaller than a threshold value in the second embodiment. FIG. 5 is a timing chart illustrating a timing of transmission and reception of signals in the vehicle-side device and the portable device, noise generated by an information device, and a state of the portable device when the signal intensity of noise component data is equal to or greater than a threshold value in the second embodiment. In FIGS. 4 and 5, (a) a signal at a second frequency (RF) received by the vehicle-side device 2, (b) a signal at a first frequency (LF) transmitted by the vehicle-side device 2, (c) a signal at the first frequency (LF) received by the portable device 3, (d) a signal at the second frequency (RF) transmitted by the portable device 3, (e) a state of the portable device, and (f) noise generated by an information device are shown. The noise in (f) of FIG. 5 shows an example in which noise NS having a low signal intensity and noise NL having a high signal intensity are included, and the signal intensities of both of the noise NS and the noise NL are equal to or greater than a threshold value. The first embodiment relates to the control of the locking of the door 1a after the user closes the door 1a, whereas the second embodiment is an embodiment relating to the control of the unlocking of the door 1a when the user approaches the vehicle 1. In the transmission of the signal from the transmission antennas ANT1 to ANT3 of the vehicle-side device 2, the signal may be transmitted from only one of the transmission antennas, or the signal may be transmitted sequentially from three transmission antennas, similar to the first embodiment.

In the keyless entry apparatus of the second embodiment, the vehicle-side device 2 transmits the start-up signal (second start-up signal) to the portable device 3 in a predetermined time period (time Tw1 in FIGS. 4 and 5). This start-up signal may have a simple waveform or signal structure not to be susceptible to an influence of noise. Further, a start-up signal of the related art often has a structure in which a start-up portion, a command portion, and an ID portion are combined, but the portable device may be started up if the portable device is capable of receiving only the start-up portion. Further, it is preferable that the signaling signal indicating that the portable device 3 has received a start-up signal Sw21 is transmitted to the vehicle-side device 2 since the signaling signal allows the start-up of the portable device 3 to be confirmed. Further, the function of the request signal may be combined with the signaling signal.

The portable device 3 that has started up in response to the start-up signal transmits a signal of data based on a reception intensity of the measurement signal transmitted from the transmission antennas ANT1 to ANT3, and noise component data based on a signal intensity of a signal received in an OFF time at which the portable device 3 does not communicate with the vehicle-side device 2, from the transmission antenna 25 to the vehicle-side device 2. Further, the portable device control unit 22 determines whether the signal intensity of the noise component data is equal to or greater than a predetermined threshold value. When the signal intensity of the noise component data is equal to or greater than the predetermined threshold value in a result of this determination, the portable device control unit 22 transmits the request signal at predetermined time intervals. More specifically, the request signal is transmitted each time a predetermined time (time Tr1 in FIG. 5) has elapsed from the transmission of the data signal based on the reception intensity of the measurement signal or in a predetermined time period. The determination as to whether the signal intensity of the noise component data is equal to or greater than a predetermined threshold value may be performed in the vehicle-side control unit 12. In this case, the noise component data is transmitted from the portable device 3 to the vehicle-side device 2, and the vehicle-side control unit 12 performs the determination on the basis of this signal.

Further, in a three-axis antenna 23, in a case in which a signal intensity received for one axis among three axes in the noise component data is greater than respective signal intensities of the two other axes, and the signal intensity is at least predetermined times (for example, at least 10 times) the signal intensity in the two other axes, data of the two axes having a small reception intensity may be used as the noise component data.

Hereinafter, description will be given in greater detail with reference to FIGS. 4 and 5.

The vehicle-side device 2 transmits the start-up signal to the portable device 3 in a predetermined time period (time Tw1 in FIGS. 4 and 5). The portable device 3 that has received a first start-up signal Sw21 starts up from a standby state to enter an active state, and transmits a signaling signal Ss indicating that the portable device 3 has received the start-up signal to the vehicle-side device 2. The vehicle-side device 2 is set to receive the signaling signal Ss after a predetermined time has elapsed or in a predetermined time from the transmission of the start-up signal Sw21 using a timer of the vehicle-side device 2, and then transmit a measurement signal Sm21 to the portable device 3.

Meanwhile, the portable device 3 receives a signal in an OFF time in which the portable device 3 does not communicate with the vehicle-side device 2 until the portable device 3 receives the measurement signal Sm21 from the vehicle-side device 2 after the transmission of the signaling signal Ss, and regards the signal as noise component data Sn21. Further, the portable device 3 determines whether an intensity of the noise component data Sn21 is equal to or greater than a predetermined threshold value.

When the portable device 3 determines that the intensity of the noise component data Sn21 is equal to or greater than the predetermined threshold value, the portable device 3 sets a remote control approach timer for a timer unit (not illustrated) included in the portable device 3 to transmit a request signal each time a predetermined time (time Tr1 in FIG. 5) has elapsed from transmission of a signal of data Sd21 based on the reception intensity of the measurement signal Sm21, as illustrated in FIG. 5. Accordingly, the intensity of the measurement signal can be performed even when there is no start-up signal from the vehicle-side device 2 by the portable device 3 requesting the transmission of measurement signal and waiting for the measurement signal at a predetermined timing using the timer managed on the portable device 3 side.

On the other hand, when the signal intensity of the noise component data Sn21 is determined to be smaller than the predetermined threshold value, the portable device 3 does not set the remote control approach timer, enters the standby state at the same time as transmission end of the signal of the data Sd21 based on the reception intensity of the measurement signal Sm21, and enters the active state each time the portable device 3 receives the start-up signal, which is transmitted in a predetermined period using the timer of the vehicle-side device.

In a remote controller approach timer operation, it is preferable that, as a semi-active state, an operation such as transmission and reception is not performed, and only the timer and the control unit for a minimum operation such as LF signal waiting are operated to achieve power saving.

Then, in the portable device 3 that has received the measurement signal Sm21 from the vehicle-side device 2, the portable device control unit 22 calculates the distance between the vehicle-side device 2 and the portable device 3 on the basis of the reception intensity of the measurement signal Sm21 output from the portable device reception unit 20. Calculated distance data Sd21 is transmitted from the transmission antenna 25 to the vehicle-side device 2. Here, the portable device 3 that has transmitted the distance data Sd21 starts up the remote control approach timer when the signal intensity of the noise component data Sn21 is equal to or greater than the predetermined threshold value, and determines that the noise is less and the start-up signal can be received from the vehicle-side device 2, does not set the remote control approach timer, and enters the standby state (sleep state) to suppress power consumption when the signal intensity of the noise component data Sn21 is smaller than the predetermined threshold value. If the portable device 3 starts up gain to enter the active state due to the start-up signal and the measurement signal transmitted in a predetermined period from the vehicle-side device 2 after the portable device 3 enters the standby state, the portable device 3 transmits a signaling signal to the vehicle-side device 2 and performs the intensity measurement using the noise component data and the measurement signal.

On the other hand, in the vehicle-side device 2 that has received the distance data Sd21, the vehicle-side control unit 12 performs a determination as to unlocking of the door 1*a* on the basis of the distance data, and outputs a signal corresponding to a result of the determination to the locking unit 32.

Then, the vehicle-side device 2 sequentially transmits start-up signals Sw22, Sw23, . . . to the portable device 3 in a predetermined time period, that is, in every time Tw1 from the transmission of the first start-up signal Sw21, and repeatedly executes the following process until unlocking of the door 1*a* is performed.

When the signal intensity of the noise component data Sn21 is smaller than the predetermined threshold value (FIG. 4), the portable device 3 returns to the standby state after the transmission of the distance data Sd21. When a next start-up signal Sw22 is received, the portable device 3 starts up from the standby state, enters the active state, and transmits the signaling signal Ss to the vehicle-side device 2. The vehicle-side device 2 is set to transmit the measurement signal after a predetermined time has elapsed from the transmission of the start-up signal or from the reception of the signaling signal.

On the other hand, when the signal intensity of the noise component data Sn21 is equal to or greater than the predetermined threshold value (FIG. 5), the portable device 3 is in a state in which the remote control approach timer starts up after the transmission of the distance data Sd21, automatically enters an active state at a time at which the predetermined time (time Tr1 in FIG. 5) has elapsed from the transmission of the distance data Sd21, and transmits a request signal Sr22 to the vehicle-side device 2. Therefore, in a case in which the start-up signal Sw22 is buried in strong noise signal N1 from the information device carried by the user as illustrated in FIG. 5, the portable device is erroneously recognized as being distant since the portable device 3 cannot be started up in the related art, whereas, in this embodiment, the portable device 3 transmits the request signal Sr22 and waits for the measurement signal, and the vehicle-side device 2 receives the request signal Sr22 and transmits the next measurement signal Sm22, such that the portable device 3 can receive the measurement signal Sm22 and measure the distance.

In FIG. 5, after the transmission of the request signal Sr22, the vehicle-side device 2 that has received the request signal Sr22 transmits the measurement signal Sm22 to the portable device 3 after a predetermined time has elapsed from the reception. The portable device 3 acquires noise component data Sn22 in the OFF time after the transmission of the request signal Sr22, and determines whether the signal intensity of the noise component data Sn22 is equal to or greater than the predetermined threshold value. When the portable device 3 determines that the signal intensity of the noise component data Sn22 is equal to or greater than the predetermined threshold value, the portable device 3 sets the remote controller approach timer to transmit a next request signal (Sr23, . . . ) each time a predetermined time Tr1 elapses from the transmission of the signal of the data Sd22 based on the reception intensity of the measurement signal Sm22. The vehicle-side device 2 that has received the request signal Sr23 transmits the measurement signal Sm23 to the portable device 3 after a predetermined time has elapsed from the reception. On the other hand, when the signal intensity of the noise component data Sn22 is determined to be smaller than the predetermined threshold value, the portable device 3 does not set the remote control approach timer and enters the standby state.

Then, in the portable device 3 that has received the measurement signal Sm22 from the vehicle-side device 2, a distance between the vehicle-side device 2 and the portable device 3 is calculated on the basis of the reception intensity of the measurement signal Sm22, and calculated distance data Sd22 is transmitted to the vehicle-side device 2.

Meanwhile, in the vehicle-side device 2 that has received the distance data Sd22, the vehicle-side control unit 12 performs a determination as to whether the door 1a is to be unlocked on the basis of the distance data, and outputs a signal corresponding to a result of the determination to the locking unit 32. For example, the door 1a is unlocked in a case in which the distance data is smaller than a predetermined threshold value, that is, in a case in which a user having the portable device approaches the vehicle 1 up to a predetermined distance.

Here, it is preferable for the request signal to be transmitted a predetermined number of times or until the signal intensity of the noise component data (Sn23, . . . ) is smaller than the threshold value. In a case in which the signal intensity of the noise component data is smaller than the threshold value and the request signal is not output, it is preferable that the start-up signal and the measurement signal are alternately transmitted using the timer of the vehicle-side device 2, and the distance is measured using the measurement signal.

From the configuration as described above, the following effects are achieved according to the keyless entry apparatus of the second embodiment.

(1) Since the portable device 3 can receive the start-up signal when the signal intensity of the noise generated from the information device carried by the user is low even when a signal intensity of the noise fluctuates, for example, as in LF noise of a smartphone, by transmitting the start-up signal (second start-up signal) in a predetermined time period, it is possible to start up the portable device 3 more reliably.

(2) In the portable device 3 or the vehicle-side device 2, it is determined whether the signal intensity of the noise component data is equal to or greater than the predetermined threshold value, and in a case in which the signal intensity of the noise component data is strong, the request signal is transmitted at predetermined time intervals. Accordingly, since the measurement signal can be received from the vehicle-side device 2, it is possible to improve the accuracy of control of the vehicle 1 without erroneous recognition of a position of the portable device due to failure of start-up of the portable device. Further, since the remote controller approach timer is set only in a necessary case such as a case in which the signal intensity of the noise component data is strong, it is possible to suppress driving power and achieve power saving.

(3) It is possible to suppress influence of noise in a long wave region output from an information device by transmitting a signal at the first frequency from the vehicle-side device 2 and transmitting a signal at the second frequency higher than the first frequency from the portable device 3.

Other configurations, operations, and effects are the same as in the first embodiment.

The present invention has been described with reference to the above embodiments. However, the present invention is not limited to the above embodiments and can be improved or changed for the purpose of improvement or in a range of spirit of the present invention.

As described above, the keyless entry apparatus according to the present invention can perform predetermined control of a vehicle accurately and reliably even when a user carries a smart phone or another information device.

It should be understood by those skilled in the art that various modifications, combinations, sub-combinations and alterations may occur depending on design requirements and other factors insofar as they are within the scope of the appended claims of the equivalents thereof.

What is claimed is:

1. A keyless entry apparatus for a vehicle, comprising:
a vehicle-side device provided on the vehicle and configured to transmit signals including a measurement signal at a first frequency; and
a portable device to be carried by a user and configured to transmit signals including a data signal at a second frequency, the data signal indicating a reception intensity of the measurement signal received from the vehicle-side device, the vehicle-side device receiving the data signal from the portable device and performing a predetermined control of the vehicle based on the reception intensity of the measurement signal indicated by the data signal,
wherein:
the vehicle-side device is further configured to transmit a start-up signal to the portable device, and the portable device is further configured to transmit a request signal to the vehicle-side device at a first predetermined time interval after receiving the start-up signal, the vehicle-side device transmitting the measurement signal to the portable device each time the vehicle-side device receives the request signal;

the vehicle-side device transmits the start-up signal to the portable device as a second start-up signal at a second predetermined time interval;

the portable device obtains, when the portable device is started up by receiving the second start-up signal, noise component data based on an intensity of a signal received during an OFF time period in which the portable device does not communicate with the vehicle-side device; and the portable device or the vehicle-side device determines whether a noise intensity indicated by the noise component data is equal to or greater than a predetermined threshold value, and the portable device transmits the request signal at the first predetermined time interval when the noise intensity is equal to or greater than the predetermined threshold value.

2. The keyless entry apparatus according to claim 1, wherein:

the vehicle-side device transmits the start-up signal to the portable device as a first start-up signal immediately after a door of the vehicle is closed by the user, and the portable device starts transmitting the request signal to the vehicle-side device in the first predetermined time interval when the portable device receives the first start-up signal.

3. The keyless entry apparatus according to claim 1, wherein the portable device obtains the noise component data during the OFF time after transmitting the request signal, and the portable device continues transmitting the request signal at the first predetermined time interval if the noise intensity is equal to or greater than the predetermined threshold value, and stops transmitting the request signal at the first predetermined time interval if the noise intensity is smaller than the predetermined threshold value.

4. The keyless entry apparatus according to claim 1, wherein:

when the portable device receives the start-up signal, the portable device transmits a signaling signal indicating that the portable device has received the start-up signal to the vehicle-side device, and the portable device transmits the request signal to the vehicle-side device after a predetermined time period has elapsed after transmitting the signaling signal.

5. The keyless entry apparatus according to claim 1, wherein:

the first frequency is in a long wave range, and the second frequency is in a high frequency range higher than the first frequency.

* * * * *